(12) United States Patent
Bowden

(10) Patent No.: US 10,987,853 B2
(45) Date of Patent: Apr. 27, 2021

(54) METHOD AND SYSTEMS FOR APPLYING STRETCH FILMS/PLASTIC FILMS AT A CONTROLLED TEMPERATURE AND/OR TRANSFER OF ELECTROSTATIC CHARGE

(71) Applicant: The Bowden Group, Honolulu, HI (US)

(72) Inventor: R. Craig Bowden, Honolulu, HI (US)

(73) Assignee: RLMB GROUP, LLC, Honolulu, HI (US)

( * ) Notice: Subject to any disclaimer, the term of this patent is extended or adjusted under 35 U.S.C. 154(b) by 166 days.

(21) Appl. No.: 16/192,761

(22) Filed: Nov. 15, 2018

(65) Prior Publication Data

US 2019/0143580 A1 May 16, 2019

Related U.S. Application Data

(63) Continuation-in-part of application No. 15/815,208, filed on Nov. 16, 2017.

(51) Int. Cl.
*B29C 55/06* (2006.01)
*B29C 55/18* (2006.01)
(Continued)

(52) U.S. Cl.
CPC .......... *B29C 55/065* (2013.01); *B29B 13/023* (2013.01); *B29C 51/46* (2013.01);
(Continued)

(58) Field of Classification Search
CPC ....... B29C 55/065; B29C 51/46; B29C 55/18; B29C 2035/0822; B29C 35/0255;
(Continued)

(56) References Cited

U.S. PATENT DOCUMENTS 2,278,472 A    4/1942 Musher
4,643,943 A    2/1987 Schoenberg
(Continued)

FOREIGN PATENT DOCUMENTS

CN    207639628 U    7/2018
EP     0274163 A2    7/1988
(Continued)

OTHER PUBLICATIONS

International Search Report and Written Opinion issued in counterpart International Patent Application No. PCT/US2018/61581 dated Mar. 14, 2019.
(Continued)

*Primary Examiner* — Robert J Grun
(74) *Attorney, Agent, or Firm* — Venable LLP; Michele V. Frank

(57) ABSTRACT

A system for controlling the temperature of a film before and/or during application, the system including: a heat source for heating a film; and stretch rollers; wherein the heat source heats the film from an ambient temperature to a temperature from about 2° C. to about 40° C. above the ambient temperature, wherein the film is heated prior to or simultaneous to being stretched by the stretch rollers, and wherein the ambient temperature is below 15° C. A system for improving the application of film by transfer of electrostatic charge is also described. The preheating system and/or electrostatic charge system may be used to enhance binding and sealing properties of stretch films used for wrapping palletized products in a reduced temperature environment. Other embodiments of the preheating film system and electrostatic charge system, and methods for their use, are described herein.

21 Claims, 5 Drawing Sheets

(51) Int. Cl.
    *B29D 7/01*     (2006.01)
    *B29C 51/46*     (2006.01)
    *B29C 35/02*     (2006.01)
    *B29B 13/02*     (2006.01)
    *B29K 105/00*     (2006.01)
    *B29C 35/08*     (2006.01)
    *B29C 35/04*     (2006.01)
    *B29C 35/12*     (2006.01)

(52) U.S. Cl.
    CPC .............. *B29C 55/18* (2013.01); *B29D 7/01* (2013.01); *B29C 35/02* (2013.01); *B29C 35/0255* (2013.01); *B29C 35/12* (2013.01); *B29C 2035/0283* (2013.01); *B29C 2035/046* (2013.01); *B29C 2035/0822* (2013.01); *B29C 2035/0855* (2013.01); *B29C 2035/0861* (2013.01); *B29C 2948/92704* (2019.02); *B29K 2105/256* (2013.01)

(58) Field of Classification Search
    CPC ...... B29C 2035/0855; B29C 2035/046; B29C 35/12; B29C 35/02; B29C 2035/0861; B29C 2948/92704; B29C 2035/0283; B29C 48/21; B29C 48/08; B29C 48/0018; B29B 13/023; B29B 13/08; B29D 7/01; B29K 2105/256
    See application file for complete search history.

(56) References Cited

U.S. PATENT DOCUMENTS

| | | | |
|---|---|---|---|
| 4,818,549 | A | 4/1989 | Steiner et al. |
| 4,886,372 | A | 12/1989 | Greengrass et al. |
| 5,964,182 | A | 10/1999 | Cox et al. |
| 6,099,892 | A | 8/2000 | Masden et al. |
| 6,265,006 | B1 | 7/2001 | Inglis et al. |
| 6,517,936 | B1 | 2/2003 | Ciocca et al. |
| 7,247,330 | B2 | 7/2007 | Kuethe et al. |
| 8,083,085 | B2 | 12/2011 | Sambrailo et al. |
| 2005/0040068 | A1 | 2/2005 | Palder |
| 2006/0198798 | A1 | 9/2006 | Tichy et al. |
| 2007/0020364 | A1 | 1/2007 | Burnett et al. |
| 2007/0059410 | A1 | 3/2007 | Steffen |
| 2007/0104836 | A1 | 5/2007 | Zhao et al. |
| 2010/0181318 | A1 | 7/2010 | Bava et al. |
| 2012/0121679 | A1 | 5/2012 | Cannon et al. |
| 2014/0322407 | A1 | 10/2014 | Man et al. |
| 2015/0306269 | A1 | 10/2015 | Bullard et al. |
| 2016/0262410 | A1 | 9/2016 | Hoefnagels |
| 2017/0013849 | A1 | 1/2017 | Thippareddi et al. |
| 2018/0360077 | A1 | 12/2018 | Krebs et al. |

FOREIGN PATENT DOCUMENTS

| | | |
|---|---|---|
| EP | 1331168 A1 | 7/2003 |
| EP | 2478780 A1 | 7/2012 |
| ES | 2393388 B1 | 11/2013 |
| JP | 5470975 B2 | 4/2014 |
| WO | 199204256 A2 | 3/1992 |
| WO | 199944444 A1 | 9/1999 |
| WO | 2010064773 A1 | 6/2010 |
| WO | 2015189351 A1 | 12/2015 |
| WO | 2016044766 A1 | 3/2016 |
| WO | 2016095024 A1 | 6/2016 |

OTHER PUBLICATIONS

International Search Report and Written Opinion issued in International Patent Application No. PCT/US2020/021484 dated Jul. 16, 2020.

Air Products, Modified atmospheric packaging (MAP) Air Product's Freshline Solutions Help Make the Application Achievable, Productive and Seamless for the End User, Air Products and Chemicals Inc., 2007.

Office Action corresponding to U.S. Appl. No. 15/815,208 dated Jun. 11, 2020.

Office Action corresponding to U.S. Appl. No. 15/815,208 dated Dec. 31, 2019.

METHOD AND SYSTEMS FOR APPLYING STRETCH FILMS/PLASTIC FILMS AT A CONTROLLED TEMPERATURE AND/OR TRANSFER OF ELECTROSTATIC CHARGE

CROSS REFERENCE TO RELATED APPLICATIONS

This application is a continuation in part of U.S. application Ser. No. 15/815,208, filed on Nov. 16, 2017, the disclosure of which is incorporated herein by reference in its entirety.

TECHNICAL FIELD

The present invention generally relates to methods and systems for applying stretch films. It further relates to methods and systems for applying stretch films for forming an improved sealed enclosure for palletized products and packaged goods. In one aspect, it relates to methods and systems for applying stretch films at a controlled temperature to improve performance and quality, including the preheating of films for forming an improved sealed enclosure for palletized products and packaged goods. More specifically, embodiments of the invention relate to preheating stretch films above ambient temperature to enhance film-to-film binding and sealing properties of various types of stretch films used to wrap and bag pallets in reduced temperature environments. In another aspect, the methods and systems relate to improving the application of film by transfer of electrostatic charge.

BACKGROUND

Perishable products or other environmentally sensitive goods risk damage from numerous sources during transportation. Sources of damage may include wind, dirt, moisture, temperature changes, insects, excessive pressure, and excessive movement. Various forms of packaging have been used to minimize damage or decay of such goods. For example, goods may be secured to a pallet to facilitate the transport of such goods and to protect the goods from damage caused by shifting during transport. To further protect the products from damage, palletized goods may be further enclosed or encased with a protective barrier or film. For example, techniques for creating an enclosure include heat shrinking plastic ("shrink wrap") around the goods which have been placed on a pallet, or placing a plastic bag around the goods on a pallet. By forming such an enclosure (so-called "load containment"), the goods can be protected from environmental factors such as moisture or other external contaminants.

Perishable products or other environmentally sensitive goods may include, for example, produce, plants, fresh or frozen foods, prepared foods, agricultural products, meats, cell cultures, tissues, organisms, electrical components, and raw materials. In order to prevent decay or spoilage, the perishable products generally must be maintained in an optimal environment specific to the type of product. The environment may control for temperature, humidity, pressure, and air or gas composition. In addition to being stored and transported in the controlled environment, the perishable products must be packed and prepared for storage and transport in the same environment.

To maintain the environment necessary to store and transport perishable goods, the perishable goods are wrapped or enclosed. Generically, the enclosure is referred to as a film, sealing film, stretch film, plastic film, or wrap. The film may be, for example, a synthetic or natural polymer.

Packaging perishable goods in preparation for transport and storage may involve stretching of the film and wrapping the film around the good or palletized goods. These techniques generally rely on film to film contact to create and maintain a seal. For example, the film may be stretched and wrapped on top of itself or on top of another piece of film. There may be adherence where there is film to film contact so that a separate adhesive may not be necessary. The film to film contact and adherence allows for the goods to be enclosed in a relatively quick, inexpensive, and simple manner, and enclosing the goods is not limited by the shape or size of the goods to be enclosed.

Films are primarily sold by the pound and the industry is very competitive, so thinner, lower cost films that are easier to manufacture are becoming more the standard, as evidenced by the industry's move away from dual-sided cling films. The trend to produce thinner gauge films that are cheaper and faster to produce has accelerated, and at the same time there is a trend to introduce numerous cast and multi-layer films that provide better product protection and containment during storage or transport but at a high cost per pound of plastic. There are many factors to consider such as environmental conditions during manufacturing, storage, transportation, and use of both lower and higher cost films making the right film choice for each application more challenging.

However, wrapping or encasing the goods with a film presents a challenge at lower temperatures because the films may exhibit diminished performance in the packaging environment compared to room temperature conditions. For example, films generally exhibit decreased ability to stretch and to adhere at the lower temperatures necessary to package, store, and transport food materials. When used in cold environments, typically there is dependence on only the thickness and formulation of the film to assure performance in a wide range of industrial applications. These challenges are also acute when creating a sealed enclosure in a cold environment by wrapping layers of stretch film around perishable products and injecting a modified atmosphere into the sealed enclosure. A modified atmosphere may include, for example, injection of gases such as nitrogen and carbon dioxide within the enclosure to deter deterioration, or maintaining a desired relative humidity level. In order to maintain a modified atmosphere, the stretch film must create a reliable, airtight enclosure. The various chemical formulations, compounds, and multilayer film combinations often fail or fall short when using them to capture or create a consistent, cost effective and reliably sealed enclosure. The characteristics of a film, such as its ability to "cling" diminish at cold temperatures, such as just above freezing. Additionally, cold rooms generally have high air flow, adding to the difficulty of stretching, applying, and sealing the films. Currently available films are intended for load containment only, and are neither appropriate for creating an airtight seal, nor use in a cold room. Because of the inherent differences in terms of product uses and a wide range of variables found in most manufactured stretch films there has been an increasing tradeoff between costs and desired performance.

A stretch film's ability to bind to itself to create a desired containment/enclosure around product(s) or a stack of goods is often difficult to achieve in some environmental applications such as freezers and cold rooms. It is even more difficult to manage these films when the goal is to create a gas tight sealed enclosure. To achieve a desired atmospheric level gas, humidity, and/or a specific environmental outcome, it is/has been necessary to either: (1) add more adhesive to the film formulation, (2) increase the thickness of the film, (3) increase the number of film layers, or (4) increase the amount of pre-stretch and the overall tension of the film. There are numerous reasons for poor results or inconsistency when using stretch films, and solving the problem to date has included the use of very tightly controlled film specifications and formulas with significant attention paid to cling characteristics that as previously described often vary in their effectiveness in frozen, cold, or industrial environments. The use of specialty films (such as custom films with added layers intended to improve film self-adherence and/or performance in colder environment) adds costs and often limits the ability to utilize multiple manufacturers to achieve a desired outcome. Additionally, batch-to-batch variability is inevitable, even for two film batches with identical specifications. The variability between batches resulted in noticeable differences in film characteristics and unreliable sealing. It may also be necessary to age the film in order to improve the cling characteristics, adding to the cost. The use of thicker films and bags in conjunction with glues and/or filament tapes to solve the problem of creating a consistent product containment (and a sealed enclosure) also increases costs and reduces the recyclability of the packaging material as a whole.

Using cheaper films and/or the inconsistency among film batches has made controlling and maintaining film tails a challenge. Film tail refer to the end portion of the wrapped film that results when the wrapped film is cut from the film roll. The film tail often does not stick adequately to the wrapped film, and hangs from the wrapped good. If not adequately secured, the film tail will catch on objects or people during transport, and will eventually lead to unraveling of the wrapped film, which compromises the containment of the good and prevents injection of a modified atmosphere. Film tails are even more problematic when using cheaper films intended for load containment purposes, because the film generally does not contain the costlier cling agents. Furthermore, when using automated systems for wrapping, lubricants are added to make the film run faster through the machines, which may lead to more issues with film tails. To prevent unraveling, film tails must be manually tucked into portions of the wrapped film and/or adhered with a tape or other adhesive. Even with such measures, the film tail may cause loosening or eventual unraveling of the film wrap. Preventing and controlling film tails becomes even more problematic in cold environments, where the film has less ability to stick to itself.

Decreased performance of the film due to the environmental conditions in which they are applied may result in diminished load containment and unreliable sealed enclosures. Thus, overcoming these deficiencies may require increased costs, for example, using more film, the necessity to purchase a thicker or costlier film material, increase in time and labor required to package and seal the goods, and the increased cost due to spoilage from improper sealing.

Therefore, there is a need to improve the efficiency of wrapping and encasing goods with a sealing film, reduce film cost, improve the binding and sealing properties of various types of stretch films used to wrap and/or bag pallets at decreased temperatures that reliably allow for the creation and maintenance of a modified atmosphere within the sealed enclosure, and increase the ability to recycle wrap materials.

SUMMARY

According to an embodiment, a method for controlling the temperature of a film before and/or during application is provided, the method comprising: warming the film from an ambient temperature to a temperature from about 2° C. to about 40° C. above the ambient temperature; stretching the film; and wrapping the film around a product; wherein the ambient temperature is below 15° C.

According to another embodiment, a system for controlling the temperature of a film before and/or during application is provided, the system comprising: a heat source for heating a film; and stretch rollers; wherein the heat source heats the film from an ambient temperature to a temperature from about 2° to about 40° C. above the ambient temperature, wherein the film is heated prior to or simultaneous to being stretched by the stretch rollers, and wherein the ambient temperature is below 15° C.

According to another embodiment, a system for controlling the temperature of a film before and/or during application is provided, the system comprising: a stretch hooder; and a heat source for heating a film; wherein the heat source heats the film from an ambient temperature to a temperature from about 2° to about 40° C. above the ambient temperature, wherein the film is heated prior to or simultaneous to being formed into a bag, and wherein the ambient temperature is below 15° C.

According to another embodiment, a method for improving the application of a film is provided, the method comprising: stretching the film; wrapping the film around a product at an ambient temperature; warming a modified atmosphere to a temperature from about 2° to about 40° C. above the ambient temperature; and injecting the modified atmosphere inside the wrapped film; wherein the ambient temperature is about 15° C.

According to another embodiment, a system for enhancing the adherence of a film before and/or during application is provided, the system comprising: an electrostatic source for charging a film; and stretch rollers; wherein the electrostatic source emits an electrostatic charge to the film, the film is charged prior to or simultaneous to being stretched by the stretch rollers.

According to another embodiment, a system for enhancing the adherence of a film before and/or during application is provided, the system comprising: an electrostatic source for charging a film; and a stretch hooder for forming a bag from the film; wherein the electrostatic source emits an electrostatic charge to the bag prior to or simultaneous to being formed, cut, or stretched.

According to another embodiment, a method for improving the application of a film is provided, the method comprising: stretching the film; charging the film with an electrostatic charge; wrapping the film around a product at an ambient temperature; injecting a modified atmosphere inside the wrapped film; wherein the ambient temperature is below 15° C.

According to another embodiment, a method for eliminating or reducing film tails for a wrapped good is provided, the method comprising: wrapping a film from a film source around a good; charging an area of the film that is yet to be wrapped around the good; cutting the area of the film that is yet to be wrapped around the good from the film source to form the film tail; and adhering the charged film tail to the wrapped good.

BRIEF DESCRIPTION OF THE DRAWINGS

The features and advantages of the invention will be apparent from the following drawings wherein like reference numbers generally indicate identical, functionally similar, and/or structurally similar elements.

DETAILED DESCRIPTION

Figure 1:
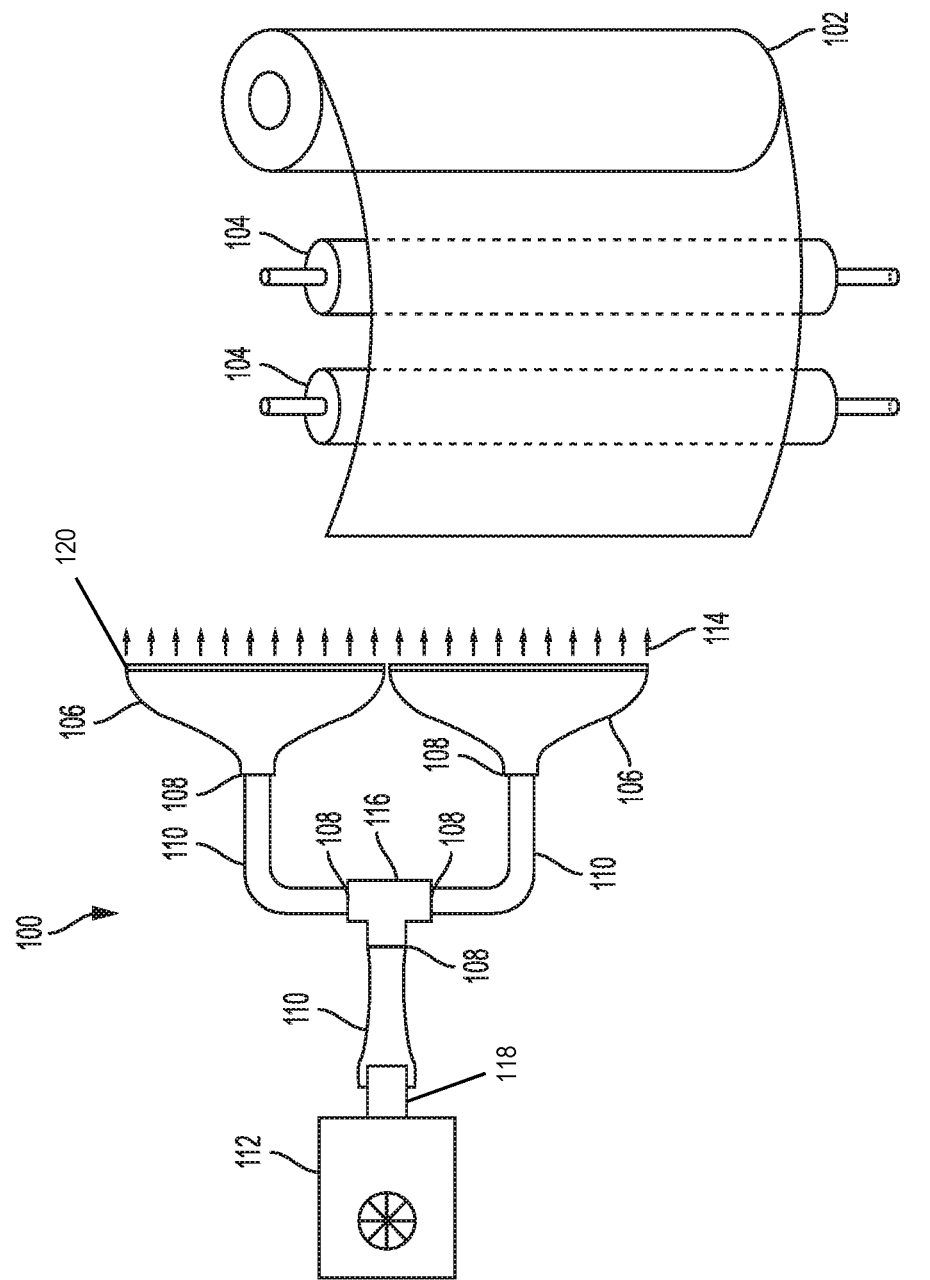
FIG. 1 is top view of a first embodiment of a system for preheating stretch film.

Embodiments of the invention are discussed in detail below. In describing embodiments, specific terminology is employed for the sake of clarity. A person skilled in the relevant art will recognize that other equivalent parts can be employed and other methods developed without departing from the spirit and scope of the invention.

Embodiments of the invention relate to warming stretch film material and/or applying an electrostatic charge to stretch film material immediately before and/or as it is being applied to create a better and more consistent sealed enclosure. The warming of the stretch film material and/or treatment with an electrostatic charge may occur as it is being prestretched and fed through the film application process, such as through or within the wrapper carriage head, or as part of the stretch-hooder as the bag is being formed, stretched, and pulled over the load on a pallet or stack of goods.

Film for preheating and/or electrostatic charge may be available on a roll and may be unrolled and wrapped around palletized goods. According to embodiments, the film may be stretched prior to wrapping by, for example, one or more stretch rollers that rotate in a direction away from the film roll. Preheating of the film roll and/or treatment of the film roll with electrostatic charge may occur before, during, or after stretching of the film. According to an embodiment, the film may be a preformed bag treated with preheating and/or electrostatic charge prior to containment. According to an embodiment, the film may be a sheet treated with preheating and/or electrostatic charge prior to containment. According to an embodiment, the film may be used in conjunction with a separate top sheet and/or bottom sheet. According to embodiments, the top sheet and/or bottom sheet may be preheated and/or treated with electrostatic charge prior to application.

For example, according to an embodiment, as the large industrial size roll of film is loaded into the machine, it may be placed in an insulated/covered box thereby warming the film as it threads from the roll of uncut film to the bag forming portions of the machine where seaming, cutting, and stretching process occurs.

This warming of the stretch film is quite a different concept and process from that of a shrink wrap film where heat is applied only after the film is covering the goods. For example, according to embodiments of the invention, advantageously no high temperature heat is required, no flame, and no carbon monoxide in the work environment. The amount of heat required to "shrink wrap" a pallet would not be acceptable in a cold room or frozen storage environment. The embodiments of the present invention are additionally advantageous over other automated systems that use gas flame and blower systems to shrink the film after application. Such systems would not be acceptable in a closed temperature controlled cold room or freezer plant with heat and carbon monoxide issues.

According to embodiments, warming a film may be from an ambient temperature that is below optimum for that film such as, for example, ≤0 to 15° C. to a temperature that is above the ambient temperature, to an increase of about 2 to about 10° C. above the cold ambient temperature. According to embodiments, an ambient temperature may be, for example, from ≤0° to about 5° C., while a film's optimal operating temperature may be above 15° C. and below 40° C.

Film may be preheated using, for example, direct conduction of heat or thermal radiation. According to embodiments, a preheating system may be incorporated into a semi-automated or automated wrapping system. For example, the preheating system may be installed before, between, or after the stretch rollers. According to embodiments, the preheating system may be installed, for example, inside the carriage head.

According to embodiments, the targeted application of the heat to the film may be transferred directly via contact with the film or indirectly as with a warming of the carriage head, for example, by directed air flow. According to embodiments, the heat source may be placed inside the carriage head or insulated area holding the film, thereby the film wrapping and or bagging equipment would then operate with film that is warmer than ambient air.

According to embodiments, the film may be heated by direct contact with a heating element or heated air. According to embodiments, the film may be heated by thermal radiation from a heated element in proximity to the film. According to embodiments, the film may be heated by friction caused by contact between the film and a surface, for example, rollers warmer than ambient air. According to an embodiment, the film may be heated using dielectric heating using radio waves or microwaves or other methods that may provide energy targeted only on the film and not the environment or product being wrapped.

According to embodiments, a modified atmosphere may be injected into the enclosure during or after wrapping with film. The modified atmosphere may include, for example, injection of gases such as nitrogen and carbon dioxide within the enclosure to deter deterioration, or maintaining a desired relative humidity level. The modified atmosphere may be warmed to a temperature above the ambient temperature. According to embodiments, the modified atmosphere may be slightly warmed prior to or during injection in addition to warming of the film. According to embodiments, a heater may be placed in the gas line or in the nozzle for injecting a modified atmosphere into the packaged products. According to embodiments, the modified atmosphere may be heated about 2 to about 40 degrees above the ambient temperature. According to embodiments, the modified atmosphere may be heated to a temperature from about −5° C. to about 0° C. According to embodiments, the modified atmosphere and the film are warmed to about the same temperature. According to embodiments, when the modified atmosphere is warmed, it may not be necessary to preheat the stretch film during or prior to application because the slightly warmed modified atmosphere may allow the stretch film to create a reliable, airtight enclosure. According to embodiments, the warmed modified atmosphere may not negatively impact the core temperature of the product.

Referring generally to FIGS. 1-4, embodiments of a film preheating system are described. Referring now to FIG. 1, the film preheater 100 may generally comprise a heating unit 112, nozzles 106, and pre-stretch rollers 104 for stretching the film released from a film roll 102. According to an embodiment, the heating unit 112 may have an integrated blower device for expelling heated air 114. According to an embodiment, the heating unit 112 may have integrated temperature and air flow adjustable controls. In the embodiment illustrated in FIG. 1, for example, heated air 114 may exit heating unit 112 through outlet 118.

Tubing 110 may connect to outlet 118 to create a pathway for heated air 114 to flow from outlet 118. According to embodiments, multiple sections of tubing 110 may connect using fitting 108. According to embodiments, tubing 110 may connect to junction 116 using fitting 108, and junction 116 may be further connected to additional tubing 110. In this manner, junction 116 may split the heated air path into multiple pathways. According to an embodiment, junction 116 may be "T" shaped to split the heated air pathway into two discrete pathways. Junction 116 may be further connected to additional tubing 110 using fitting 108.

According to an embodiment, tubing 110 may be connected to each nozzle 106 using fitting 108. According to the embodiment of FIG. 1, heated air 114 exits heating unit 112 through outlet 118 and is directed through two different pathways each including junction 108, tubing 110, and nozzle 106. Each nozzle 106 may contain openings 120 that allow the heated air 114 to exit preheating system 100 and contact the film 102. According to an embodiment, each nozzle 106 may contain a slit opening. This would use a small amount of heat and more air flow to achieve the warming of the film.

According to embodiments, film preheater 100 may be incorporated into a semi-automated or automated wrapping system. For example, film preheater 100 may be installed before, between, or after the stretch rollers 104. According to embodiments, film preheater 100 may be installed, for example, inside the carriage head.

Heating unit 112 may be, for example, heat pads, blocks, wires, electric heat guns with fans, industrial-type air dryer, focused heat lamps of various types, infrared lamps, and targeted ultrasound. Tubing 110 may be formed from a variety of materials including plastics, such as high-density polyethylene, low-density polyethylene, polypropylene, or other thermally appropriate plastics, for example. Nozzle 106 may be made from a variety of materials including plastics or metals.

Figure 2:
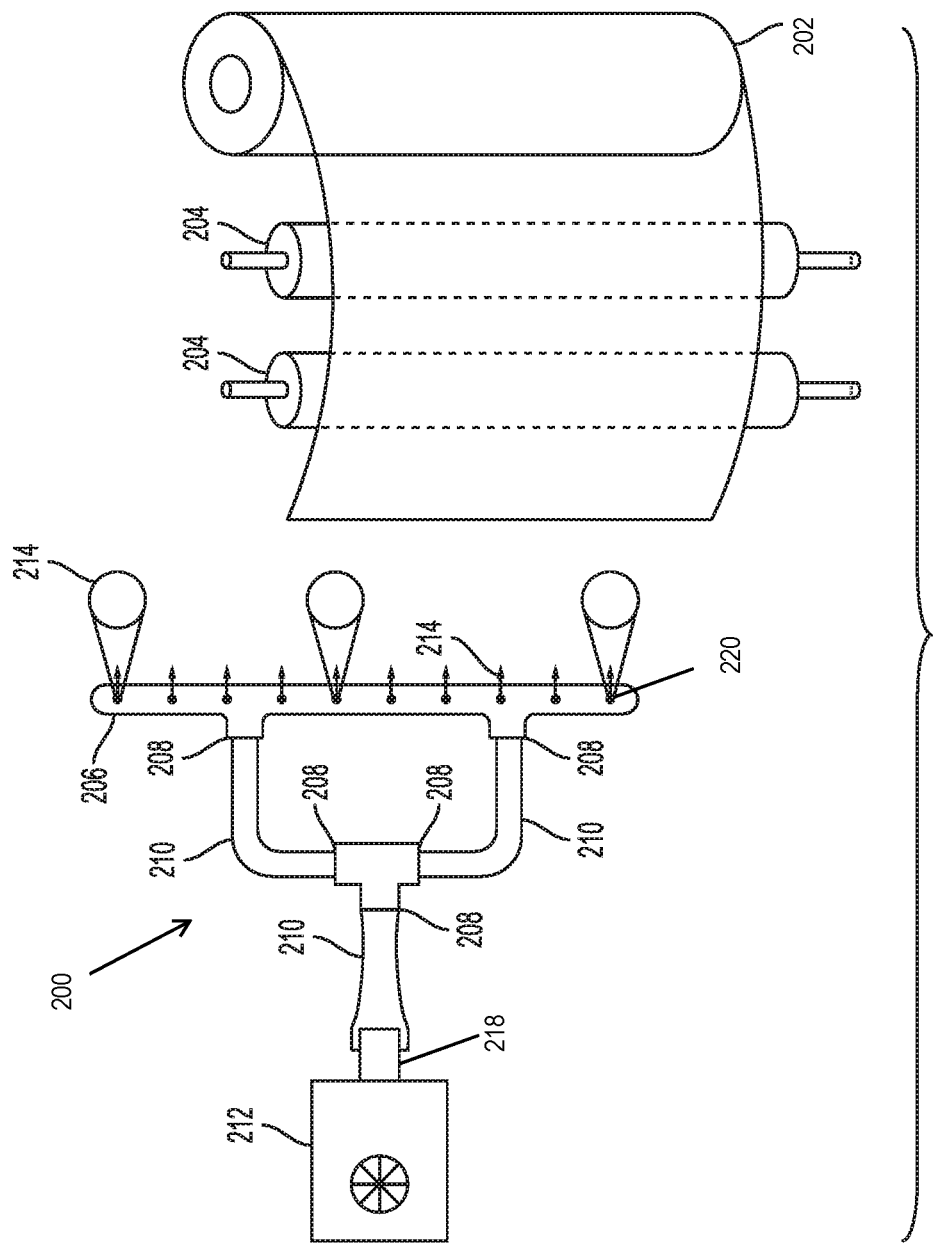
FIG. 2 is a top view of a second embodiment of a system for preheating stretch film.

The shape, size, number, and distribution of the openings 120 in nozzle 106 is not limited. For example, the shape, size, number, and distribution of openings may be selected based on the desired air flow, temperature increase of the film, and time of preheating the film. The embodiment of FIG. 2 is the same as FIG. 1, except as described herein. For example, according to the embodiment of FIG. 2, heated air 214 exits heating unit 212 through outlet 218 through junction 208, tubing 210, and a pipe 206 that is connected to both sections of tubing 210. Pipe 206 may contain a plurality of orifices 220 that allow the heated air 214 to exit preheating system 200 and contact the film. According to embodiments, preheating system 200 may be installed before, between, or after the stretch rollers 204. According to embodiments, the preheating system may be installed, for example, inside the carriage head.

Figure 3:
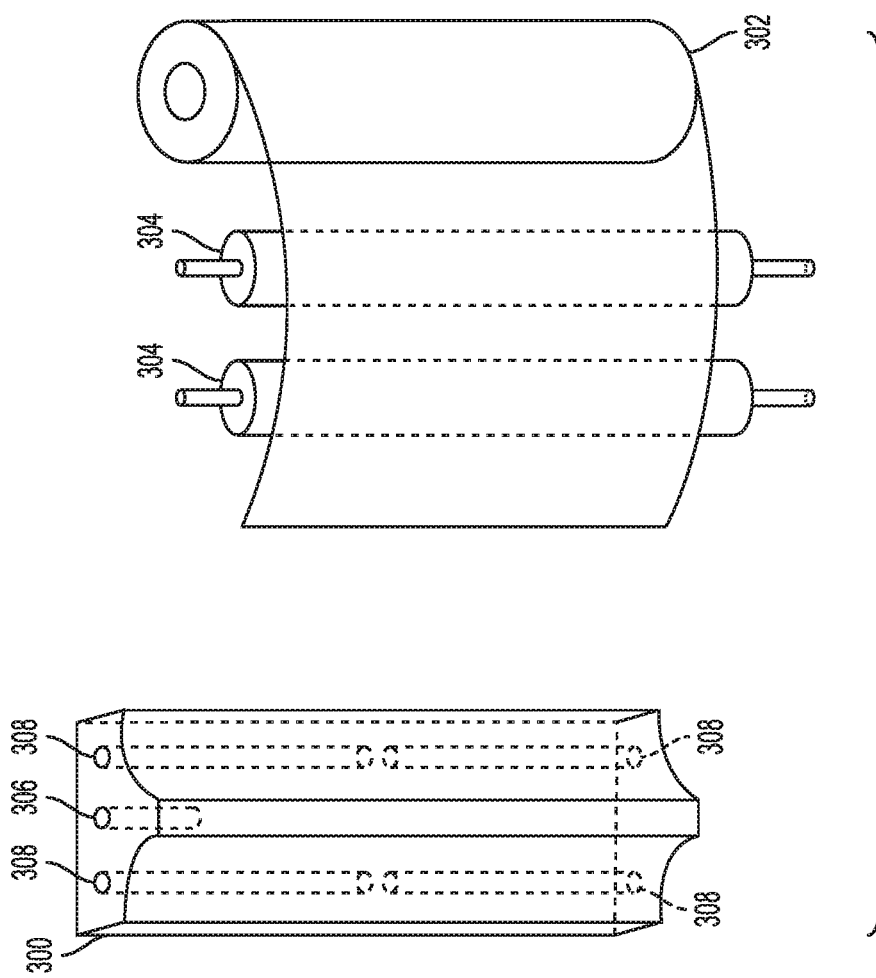
FIG. 3 is a top view of a third embodiment of a system for preheating stretch film.

According to the embodiment of FIG. 3, the heating unit may be comprised of a heating block 300. Heating block 300 may be formed from metal or metal alloy. According to embodiments, the heating block 300 is formed from a metal or metal alloy that reflects infrared radiation. According to an embodiment, the heating block 300 is formed from aluminum or an aluminum alloy.

According to embodiments, heating block 300 may house heating elements and thermostats and thermal sensors. For example, heating block 300 may contain slot 306 into which a thermostat is placed. The thermostat may be, for example, a heat sensor to control the amount of heat and in some cases air flow in order to keep heat and film temperature in an optimal range without using high or excess heat. Heating block 300 may contain slot 308 into which a heating element is placed. The heating element and thermostat may be electronically controlled to a specified temperature set point. According to embodiments, the heating element may provide for heat set points of from about −5° to about 40° C.

According to an embodiment, heating block 300 makes direct contact with the film and thereby heats the film by conduction. According to embodiments, heating block 300 does not make direct contact with the film and thereby heats the film by thermal radiation. According to embodiments, heating block 300 may be installed before, between, or after the stretch rollers 304. According to embodiments, heating block 300 may be installed, for example, inside the carriage head.

Figure 4:
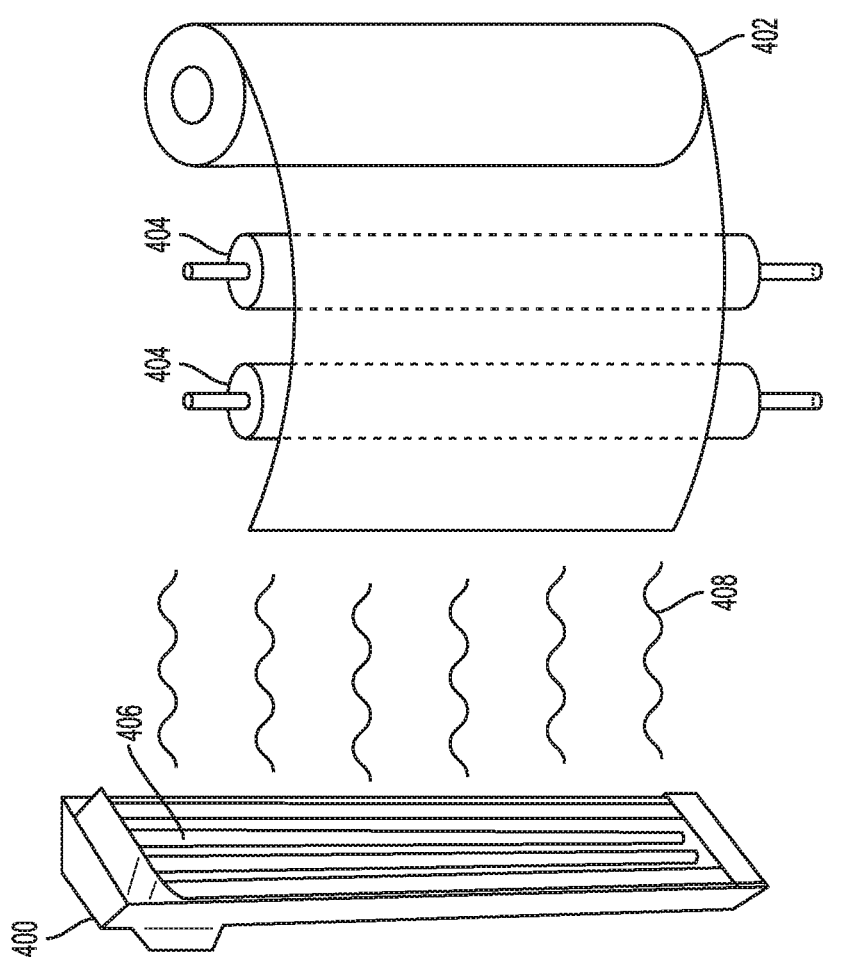
FIG. 4 is a top view of a fourth embodiment of a system to for preheating stretch film.

According to the embodiment of FIG. 4, the heating unit may be comprised of a lamp 400. Lamp 400 may be an infrared heat lamp containing infrared source 406. Infrared source may be located in proximity to film 402 thereby heating the film by radiating infrared radiation 408. According to embodiments, lamp 400 may be installed before, between, or after the stretch rollers 404. Lamp 400 may be installed, for example, inside the carriage head.

According to embodiments, the preheating system of the above disclosed embodiments may be used when the nature of the packaged good, for example, food products, necessitates that the packaging, palletization, and stacking occur at a temperature and/or humidity that may result in suboptimal performance of packaging film. According to embodiments, the preheating system may be used at temperatures below room temperature. According to embodiments, the preheating system may be used at temperatures below 16° C. According to embodiments, the preheating system may be used at about −5° to 30° C. According to embodiments, the preheating system may be used to heat the film up to a temperature of about 50° C.

According to embodiments, the film may be a synthetic or natural polymer. According to an embodiment, the film may be a plastic polymer. According to embodiments, the film is polyolefin, PVC, polyethylene, polypropylene, polyester, ethylene propylene, ethylene vinyl acetate, low density polyethylene, linear low density polyethylene and the like. According to embodiments, the film may be cellulose or polysaccharide polymer. According to embodiments, the film may contain a plurality of layers. According to embodiments, the film may be a coextrusion or laminate. According to embodiments, the film may contain chemical additives to impart specific properties, for example, lubrication, anti-static, anti-slip, anti-block, extrusion aids, tackifiers, cling agents, pigments, anti-fog, sanitizers, fungicides, antimicrobial agents, nanoparticles, other functional additives that may enhance the film sealing, atmosphere retention, treatments to the headspace of the modified atmosphere, and the like. According to an embodiments, the film may contain copper or metal ions, mineral compounds, or other nanoparticles.

According to embodiments, the amount of heat required may be varied in terms of amount and distribution within the film dispensing head, rollers, or carriage head to achieve the optimal film utilization as well as the optimal sealing bonds between films used in the creation of the sealed enclosures.

According to embodiments, the heating elements may vary in size and shape and the heat may be continuous or provided in short bursts as necessary. According to embodiments, the film may be warmed about 0° to about 40° C. relative to the environmental temperature. According to embodiments, the film may be warmed to about 2° to about 30° C.

The relative warming of the film above the ambient air/film temperature as it is being applied and/or immediately before application may improve the stretch film utilization efficiency and enhance the ability of the stretch film to create a sealed enclosure. In contrast to shrink wrapping, embodiments of the invention do not adversely impact the ambient temperature or the temperature of the goods. In this manner, the ability of the film to securely contain products is improved while maintaining the necessary reduced temperature environment.

According to embodiments, the stretch film warming process may be further enhanced by adding an electrostatic charge or alternating charge to one or more layers of film and/or activating charged particles within the film itself to make film to film bonding more effective. According to embodiments, the type of film, for example, blown layer or cast; the thickness or gauge of the film; and film formulation may be selected to further improve the efficiency, consistency, and quality of film being applied.

According to embodiments, sealing of stretch films may be improved by adding an electrostatic charge without additional warming of the film. According to embodiments, an electrostatic charge device may be incorporated into the film head such that a charge is transferred to the film as the film is passed by the electrostatic charge device. According to embodiments, an electrostatic charge device may be incorporated onto a stretch hooder such that the charge is transferred to the film before it is formed into a bag, simultaneous to the film being formed into a bag, or after the film has been formed into a bag. According to embodiments, a bottom sheet is also charged by the electrostatic charge device. According to embodiments the bottom sheet and the bag are oppositely charged. According to embodiments, the electrostatic charge device may emit a positive electrostatic charge to the film. According to embodiments, the electrostatic charge device may emit a negative electrostatic charge to the film. According to embodiments, the electrostatic charge device may alternate between emitting a positive electrostatic charge and emitting a negative electrostatic charge, such that the film has alternating positive and negative charge as it is being released from the film head. In this manner, the sections of film with positive charge are attracted to sections of the film with negative electrostatic charge as the film is wrapped over itself as the film is being wrapped around the product. According to embodiments, the system may include two carriage heads with two rolls of film that are wrapped over each other. According to embodiments, one carriage head may contain a positive electrostatic charge device, and the second carriage head may contain a negative electrostatic charge device such that the film from one carriage head overlaps and seals with the film from the second carriage head.

According to embodiments, the electrostatic charge device may be incorporated into an automated or semi-automated system for wrapping a product. According to an embodiment, the product is a stack of pallets. According to an embodiment, the product is a stack of goods, such as, produce.

According to embodiments, the level of electrostatic charge from the electrostatic charge device can be controlled or programmed by a rheostatic control. According to embodiments the amount of time for emitting the electrostatic charge to the film may be controlled or programmed.

By treating the film or films with an electrostatic charge, the electrostatic charge attracts the film to either itself or another piece of film. In some embodiments, the oppositely charged film will attract one another, improving the "cling" of the film. Thus the electrostatic charge enables the film to maintain its "cling" properties, despite the diminished film characteristics due to the low temperature. Further, the electrostatic charge improves precise wrapping of the film around a product in a cold room with increased air flow, the air flow typically preventing the film from wrapping the product precisely and therefore preventing an airtight seal. Further, the electrostatic charge attracts two portions of film allowing formation of an airtight seal even with film that would not normally form such a seal due to film composition or thickness.

According to embodiments, a modified atmosphere may be injected into the enclosure during or after wrapping the film that has been treated with electrostatic charge. The modified atmosphere may include, for example, injection of gases such as nitrogen and carbon dioxide within the enclosure to deter deterioration, or maintaining a desired relative humidity. Additionally, because the electrostatic charge results in a reliable airtight enclosure, according to embodiments, the modified atmosphere may include ozone, which typically cannot be injected outside of an airtight enclosure because of the additional risk to workers.

Figure 5:
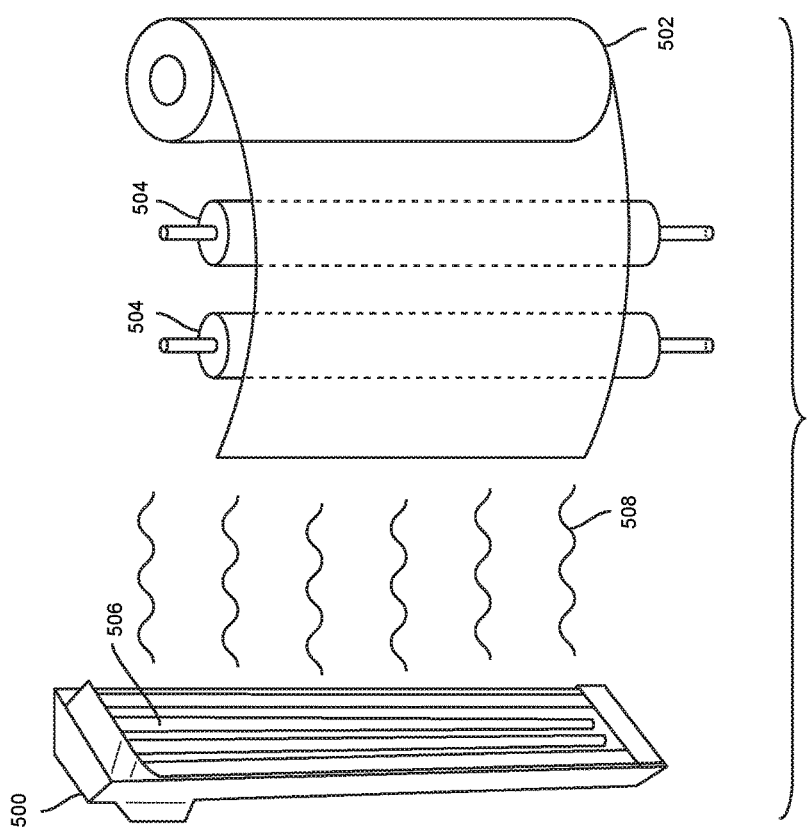
FIG. 5 is a top view of an embodiment of a system for treating stretch film with an electrostatic charge.

Referring generally to FIGS. 5 and 6, embodiments of an electrostatic charge system are described. Referring now to FIG. 5, an electrostatic charge device 500 may be located in proximity to film 502 thereby emitting electrostatic charge 508 to film, as the film is passed by electrostatic charge device 500. According to embodiments, electrostatic charge device 500 may be installed before, between or after the stretch rollers 504. According to embodiments, the film may be receive a charge when it passed within, for example, one inch of the electrostatic charge device.

Electrostatic charge device 500 may be installed, for example, outside of the film carriage head. According to an embodiment, the electrostatic charge device may be installed, for example, inside the film carriage head. An automated system for wrapping a product may include two film carriage heads, with an electrostatic charge device installed on each carriage head.

According to embodiments, the electrostatic charge system of the above disclosed embodiments may be used when the nature of the packaged good, for example, food products, necessitates that the packaging, and/or palletization, and/or stacking occurs at a temperature and/or humidity that may result in suboptimal performance of packaging film. According to embodiments, the electrostatic charge system may be used at around room temperature to enhance film adhesion, for example, when using inexpensive film, thin film, or film that has inadequate cling properties to otherwise allow for formation of an airtight seal. According to embodiments, the electrostatic charge system may be used at temperatures below room temperature. According to embodiments, the electrostatic charge system may be used at temperatures below 16° C. According to embodiments, the electrostatic charge system may be used at about −5° to 30° C.

According to embodiments, the film used with an electrostatic charge system may be a synthetic or natural polymer or a combination thereof. According to embodiments, the film may be a plastic polymer. According to embodiments, the film is polyolefin, PVC, polyethylene, polypropylene, polyester, ethylene propylene, ethylene vinyl acetate, low density polyethylene, linear low density polyethylene, and the like. According to embodiments, the film may be cellulose or polysaccharide polymer. According to embodiments, the film may contain a plurality of layers of the same or differing composition. According to embodiments, the film may be a coextrusion or laminate. According to embodiments, the film may contain chemical additives to impart specific properties, for example, lubrication, anti-static, anti-slip, anti-block, extrusion aids, tackifiers, cling agents, pigments, anti-fog, sanitizers, fungicides, antimicrobial agents, nanoparticles, other functional additives that may enhance the film sealing, atmosphere retention, treatments to the headspace of the modified atmosphere, and the like. According to an embodiments, the film may contain copper or metal ions, mineral compounds, or other nanoparticles.

According to embodiments, the electrostatic charge process may be further enhanced by warming the film to further enhance the film bonding. According to embodiments, the type of film, for example, blown layer or cast; the thickness of the gauge of the film; and the film formulation may be selected to further improve the efficiency, consistency, and quality of film being applied.

In developing this technology, the inventor discovered through extensive experimentation the relationship between the amount and intensity of the charge, the timing for applying the charge, the location of applying the charge, the composition of the film, and the ambient temperature. For example, too high of an intensity of charge will negatively impact the ability to apply the film to the enclosure. For example, too intense of a charge may cause the film to bind or melt at the carriage head, preventing proper film dispensing and wrapping. The intensity of the electrostatic charge may depend on how much charge is being applied to the film and/or how long the charge is applied to the film. Additionally, depending on the specific process being used, an electrostatic charge cannot be turned on at certain points in the process, as it will shock operators using the machine that need to handle the products and/or carriage head. According to embodiments, the electrostatic charge is turned on as film is dispensed and turned off when the film dispensing stops. According to embodiments, the electrostatic charge device is programmed to turn on and off automatically based on movement of the film head.

According to embodiments, the output current for the electrostatic charge is about 1 mA. According to embodiments, the output current for the electrostatic charge is from about 0.1 mA to about 0.8 mA. According to embodiments, the output current for the electrostatic charge is about 0.2 mA to about 0.5 mA. According to embodiments, the output current for the electrostatic charge is about 0.3 mA.

According to embodiments, the output voltage for the electrostatic charge is about 0.000001 to about 30 kVDC. According to embodiments, the output voltage for the electrostatic charge is about 50 to about 200 mV. According to embodiments, the output voltage for the electrostatic charge is about 120 mV.

According to embodiments, the operating distance of the electrostatic charge device from the film is from about 1 mm to about 250 mm. According to embodiments, the operating distance of the electrostatic charge device from the film is from about 1 mm to about 100 mm. According to embodiments, the operating distance of the electrostatic charge device from the film is from about 25 mm to about 75 mm. According to embodiments, the operating distance of the electrostatic charge device from the film is about 50 mm.

According to embodiments, the film is from about 0.1 mm to about 1 mm in thickness. According to an embodiment, the film is about 0.5 to about 0.8 mm in thickness.

Example 1

A preliminary head to head comparison was conducted testing sealed enclosures formed in a cold room without the use of electrostatic charge (Pallet A), and identical enclosures formed with the same batch of film (~0.7 mm) and in the same environment using electrostatic charge of about 120 mV (Pallets B and C). Pallets B and C differed slightly in the distance from the electrostatic bar (~1 to 2 inches). A visual inspection of the film as the enclosure was formed showed an obvious attraction between the electrostatically charged films. No such attraction was formed between the films that were not subject to electrostatic charge. Furthermore, elimination of film tails resulted in the film subjected to electrostatic charge, while the untreated film resulted in film tails. All enclosures were injected with a modified atmosphere of $CO_2$ and ozone. Atmosphere retention data was collected on all enclosures at the top, middle, and bottom of the wrapped pallet. Retention data was collected after initial injection, and at repeated intervals up to 120 hours (five days) after wrapping.

TABLE 1

Pallet A (no charge)

|  | Initial | 24 Hrs | 48 Hrs | 72 Hrs | 120 Hrs |
| --- | --- | --- | --- | --- | --- |
| Top (%) | 30.6 | 17.2 | 16.7 | 15.0 | 11.4 |
| Mid (%) | 60.2 | 32.4 | 22.4 | 17.2 | 12.2 |
| Bottom (%) | 67.3 | 41.9 | 24.1 | 18.3 | 12.3 |
| Average (%) | 52.7 | 30.5 | 21.1 | 16.8 | 12.0 |

TABLE 2

Pallet B (Electrostatic charge)

|  | Initial | 24 Hrs | 48 Hrs | 72 Hrs | 120 Hrs |
| --- | --- | --- | --- | --- | --- |
| Top (%) | 1.7 | 25.0 | 27.3 | 25.3 | 22.1 |
| Mid (%) | 49.2 | 25.9 | 27.4 | 25.4 | 22.2 |
| Bottom (%) | 69.7 | 32.8 | 27.1 | 25.4 | 22.0 |
| Average (%) | 40.2 | 27.9 | 27.3 | 25.4 | 22.1 |

TABLE 1

Pallet C (Electrostatic charge)

|  | Initial | 24 Hrs | 48 Hrs | 72 Hrs | 120 Hrs |
| --- | --- | --- | --- | --- | --- |
| Top (%) | 1.0 | 21.8 | 17.0 | 17.2 | 14.4 |
| Mid (%) | 23.6 | 29.6 | 18.8 | 18.0 | 14.5 |
| Bottom (%) | 74.5 | 29.6 | 21.4 | 18.1 | 14.9 |
| Average (%) | 33.0 | 27.0 | 19.1 | 17.8 | 14.6 |

The enclosures treated with electrostatic charge during wrapping showed both reduced time for the top, middle, and bottom of the pallet to reach equilibrium, and improved gas retention over time. Note that Pallet A (without electrostatic charge treatment) had a much higher initial gas reading, but showed significant gas loss. The enclosure formed with the electrostatically charged film showed both higher gas levels after 72 hours, and less gas loss compared to their respective initial readings than the enclosure that was not treated with electrostatic charge, indicating that the electrostatic charge resulted in a better seal as compared to the film that was not treated with the electrostatic charge. In general, a reading of 12% after five days would be considered the minimal acceptable gas retention.

It is foreseen that the aspects and features of the various embodiments described herein may be used in combination with each other.

The film preheating systems 100, 200, 300, and 400 of the described embodiments may be used to preheat film for enhanced film performance while packaging and wrapping at decreased temperatures. Advantageously, the film preheaters of the described embodiments provide a simple and cost-effective method for creating a better sealed enclosure using stretch films. The described embodiments warm the film enough to enhance the binding of layers of the film to improve the ability of the film to securely contain products, to create a better sealed enclosure that further secures the enclosure from leaking or losing the desired product protection during processing, storage, or transport. Further, the described embodiments do not negatively impact the controlled temperature of the goods, which would otherwise promote product damage or spoilage. Additionally, the increased effectiveness of the film in creating sealed enclosures may obviate the need for tape or adhesives, increasing the recyclability of the packaging material.

The electrostatic charge systems 500 and 600 of the described embodiments may be used to transfer electrostatic charge to film for enhanced film performance and sealing while packaging, wrapping, and injecting a modified atmosphere at decreased temperatures. Advantageously, the electrostatic charge systems provide a simple and cost effective method for creating better sealed enclosure using stretch film. The described embodiments increase the attraction between two portions of film enough to form an airtight seal that further secures the enclosure from leaking or losing the desired modified atmosphere during processing, storage, or transport. Further, the described embodiments do not negatively impact the controlled temperature of the goods. Additionally, the increased effectiveness of the film in creating sealed enclosures may obviate the need for tape or adhesives and more expensive or specialty films, which increasing the recyclability of the packaging material and allows for less material decreasing packaging waste.

The electrostatic charge process, system and/or method may be used alone and/or in combination, in whole or in part, with the warming of the film, and vice versa. These features can be used alone and/or in combination to further enhance film bonding. These features can be used alone and/or in combination to form an improved sealed enclosure for palletized products and packaged goods.

According to embodiments, a method for controlling the temperature of a film before and/or during application is provided, the method comprising: warming the film from an ambient temperature to a temperature from about 2° C. to about 40° C. above the ambient temperature; stretching the film; and wrapping the film around a product; wherein the ambient temperature is below 15° C. According to embodiments, the ambient temperature is about 23° C. According to embodiments, the film may be comprised of polyolefin, PVC, polyethylene, polypropylene, polyester, ethylene propylene, ethylene vinyl acetate, low density polyethylene, linear low density polyethylene or a combination thereof. According to embodiments, the film may be warmed by direct contact with warmed air, infrared radiation using a lamp, conduction using a metal heat block, and/or radiation using a metal heat block. According to embodiments, the perishable product maintains a temperature of below 15° C. during the warming, stretching, and wrapping steps. According to embodiments, the warming step occurs prior to or simultaneous with the stretching step. According to embodiments, the ambient temperature is from about 0° to about 15° C. According to embodiments, the ambient temperature is about 23° C. According to embodiments, the method further comprises: injecting a modified atmosphere inside the wrapped film. According to embodiments, the wrapping step forms an airtight sealed enclosure around the perishable product. According to embodiments, the method further comprises: injecting a modified atmosphere inside the airtight sealed enclosure. According to embodiments, the method further comprises: maintaining an atmosphere inside the airtight sealed enclosure.

According to embodiments, the method further comprises: forming a bag from the film; wherein the bag is warmed prior to or simultaneous to being formed or stretched. According to embodiments, the bag may be formed by, for example, a stretch hooder. According to embodiments, the film may be comprised of polyolefin, PVC, polyethylene, polypropylene, polyester, ethylene propylene, ethylene vinyl acetate, low density polyethylene, linear low density polyethylene or a combination thereof. According to embodiments, the film may be warmed by direct contact with warmed air, infrared radiation using a lamp, conduction using a metal heat block, and/or radiation using a metal heat block. According to embodiments, the perishable product maintains a temperature of below 15° C. during the warming, stretching, and wrapping steps. According to embodiments, the warming step occurs prior to or simultaneous with the stretching step. According to embodiments, the ambient temperature is from about 0° to about 15° C. According to embodiments, the ambient temperature is about 23° C. According to embodiments, the method further comprises: injecting a modified atmosphere inside the wrapped film. According to embodiments, the wrapping step forms an airtight sealed enclosure around the perishable product. According to embodiments, the method further comprises: injecting a modified atmosphere inside the airtight sealed enclosure. According to embodiments, the method further comprises: maintaining an atmosphere inside the airtight sealed enclosure.

According to embodiments, a system for controlling the temperature of a film before and/or during application is provided, the system comprising: a heat source for heating a film; and stretch rollers; wherein the heat source heats the film from an ambient temperature to a temperature from about 2° C. to about 40° C. above the ambient temperature, wherein the film is heated prior to or simultaneous to being stretched by the stretch rollers, and wherein the ambient temperature is below 15° C. According to embodiments, the ambient temperature is about 23° C. According to embodiments, the preheating system may be located inside of a carriage head. According to embodiments, the heat source comprises an infrared lamp, a metal heat block, and/or heated air. According to embodiments, the film is comprised of polyolefin, PVC, polyethylene, polypropylene, polyester, ethylene propylene, ethylene vinyl acetate, low density polyethylene, linear low density polyethylene or a combination thereof. According to embodiments, the ambient temperature is from about 0° to about 15° C. According to embodiments, the ambient temperature is about 23° C.

According to embodiments, a system for controlling the temperature of a film before and/or during application is provided, the system comprising: a stretch hooder; and a heat source for heating a film; wherein the heat source heats the film from an ambient temperature to a temperature from about 2° C. to about 40° C. above the ambient temperature, wherein the film is heated prior to or simultaneous to being formed into a bag, and wherein the ambient temperature is below 15° C. According to embodiments, the ambient temperature is about 23° C. According to embodiments, the preheating system is located on the stretch hooder. According to embodiments, the heat source comprises an infrared lamp, a metal heat block, and/or heated air. According to embodiments, the film is comprised of polyolefin, PVC, polyethylene, polypropylene, polyester, ethylene propylene, ethylene vinyl acetate, low density polyethylene, linear low density polyethylene or a combination thereof. According to embodiments, the ambient temperature is from about 0° to about 15° C. According to embodiments, the ambient temperature is about 23° C.

According to embodiments, a method for improving the application of a film is provided, the method comprising: stretching the film; wrapping the film around a product at an ambient temperature; warming a modified atmosphere to a temperature from about 2° C. to about 40° C. above the ambient temperature; and injecting the modified atmosphere inside the wrapped film; wherein the ambient temperature is below 15° C. According to embodiments, the ambient temperature is about 23° C. According to embodiments, the method further comprises forming a bag, wherein the bag is wrapped around the product at an ambient temperature.

According to embodiments, a system for enhancing the adherence of a film before and/or during application is provided, the system comprising: an electrostatic source for charging a film; and stretch rollers; wherein the electrostatic source emits an electrostatic charge to the film, the film is charged prior to or simultaneous to being stretched by the stretch rollers. According to embodiments, the electrostatic source is located on a film carriage head. According to embodiments, the electrostatic source emits a positive charge, a negative charge, or alternates between a positive charge and a negative charge. According to embodiments, the system further comprises a first film carriage head and a second film carriage head, wherein the first film carriage head comprises a positive electrostatic source and the second film carriage head comprises a negative electrostatic source. According to embodiments, the electrostatic source emits an output from about 0.1 mA to about 0.9 mA. According to embodiments, wherein the electrostatic source emits a voltage from about 50 mV to about 200 mV. According to embodiments, the electrostatic source emits a voltage of about 120 mV. According to embodiments, the operating distance of the electrostatic source is from about 5 mm to about 250 mm from the film. According to embodiments, the operating distance of the electrostatic source is about 50 mm. According to embodiments, the ambient temperature is from about −5° to about 15° C. According to embodiments, the ambient temperature is about 23° C. According to embodiments, the electrostatic source emits the electrostatic charge to a top sheet and/or bottom sheet. According to embodiments, the electrostatic charge activates functional additives incorporated into the stretch film that improve film characteristics of binding, sealing, sanitizing, or atmosphere treatment effectiveness. According to embodiments, the chemical properties incorporated into the stretch film are cling agents or sanitizing agents.

According to embodiments, a system for enhancing the adherence of a film before and/or during application is provided, the system comprising: an electrostatic source for charging a film; and a stretch hooder for forming a bag from the film; wherein the electrostatic source emits an electrostatic charge to the bag prior to or simultaneous to being formed, cut, or stretched. According to embodiments, the electrostatic source is located on the stretch hooder. According to embodiments, the electrostatic source emits a positive charge, a negative charge, or alternates between a positive charge and a negative charge. According to embodiments, the electrostatic source emits an output from about 0.1 mA to about 0.9 mA. According to embodiments, the electrostatic source emits a voltage from about 50 mV to about 200 mV. According to embodiments, the electrostatic source emits a voltage of about 120 mV. According to embodiments, the operating distance of the electrostatic source is from about 5 mm to about 250 mm from the film. According to embodiments, the operating distance of the electrostatic source is about 50 mm. According to embodiments, the ambient temperature is from about −5° to about 15° C. According to embodiments, the ambient temperature is about 23° C. According to embodiments, the electrostatic source emits the electrostatic charge to a bottom sheet. According to embodiments, the electrostatic charge activates functional additives incorporated into the stretch film that improve film characteristics of binding, sealing, sanitizing, or atmosphere treatment effectiveness. According to embodiments, the chemical properties incorporated into the stretch film are cling agents or sanitizing agents.

According to embodiments, a method for improving the application of a film is provided, the method comprising: stretching the film; charging the film with an electrostatic charge; wrapping the film around a product at an ambient temperature; and injecting a modified atmosphere inside the wrapped film; wherein the ambient temperature is below 15° C. According to embodiments, the film is charged by an electrostatic source located on a film carriage head or a stretch hooder. According to embodiments, the film is charged with a positive charge, a negative charge, or alternating between a positive charge and a negative charge. According to embodiments, the electrostatic source emits an output from about 0.1 mA to about 0.9 mA. According to embodiments, the electrostatic source emits a voltage from about 50 mV to about 200 mV. According to embodiments, the electrostatic source emits a voltage of about 120 mV. According to embodiments, the operating distance of the electrostatic source is from about 5 mm to about 250 mm from the film. According to embodiments, the operating distance of the electrostatic source is about 120 mV. According to embodiments, the ambient temperature is from about −5° to about 15° C. According to embodiments, the ambient temperature is about 23° C. According to embodiments, the method further comprises charging a top sheet and/or bottom sheet.

According to embodiments, a method for eliminating or reducing film tails from a wrapped good is provided, the method comprising: wrapping a film from a film source around a good; charging an area of the film that is yet to be wrapped around the good; cutting the area of the film that is yet to be wrapped around the good from the film source to form the film tail; and adhering the charged film tail to the wrapped good. According to embodiments, the film is charged by an electrostatic source located on a film carriage head or a stretch hooder. According to embodiments, the film is charged with a positive charge, a negative charge, or alternating between a positive charge and a negative charge. According to embodiments, the electrostatic source emits an output from about 0.1 mA to about 0.9 mA. According to embodiments, the electrostatic source emits a voltage from about 50 mV to about 200 mV. According to embodiments, the electrostatic source emits a voltage of about 120 mV.

According to embodiments, the operating distance of the electrostatic source is from about 5 mm to about 250 mm from the film. According to embodiments, the operating distance of the electrostatic source is about 120 mV. According to embodiments, the ambient temperature is from about −5° to about 15° C. According to embodiments, the ambient temperature is about 23° C. According to embodiments, the method further comprises charging a top sheet and/or bottom sheet.

While various exemplary embodiments have been described above, it should be understood that they have been presented by way of example only, and not limitation. Aspects of one embodiment can be used with other aspects of other embodiments of the invention in various combinations. Thus, the breadth and scope of the present disclosure should not be limited by any of the above-described exemplary embodiments.

I claim:

1. A system for enhancing adherence of a film before and/or during application of the film to a product, the system comprising:
    an electrostatic source for charging a film; and
    stretch rollers for stretching the film;
    wherein the electrostatic source emits an electrostatic charge to the film, and
    wherein the film is charged prior to or simultaneous to being stretched by the stretch rollers.

2. The system of claim 1, wherein the electrostatic source is located on a film carriage head.

3. The system of claim 1, wherein the electrostatic source emits a positive charge, a negative charge, or alternates between a positive charge and a negative charge.

4. The system of claim 2, wherein the system further comprises a first film carriage head and a second film carriage head, wherein the first film carriage head comprises a positive electrostatic source and the second film carriage head comprises a negative electrostatic source.

5. The system of claim 1, wherein the electrostatic source emits an output from about 0.1 mA to about 0.9 mA.

6. The system of claim 1, wherein the electrostatic source emits a voltage from about 50 mV to about 200 mV.

7. The system of claim 1, wherein an operating distance of the electrostatic source is from about 5 mm to about 250 mm from the film.

8. The system of claim 1, wherein an ambient temperature is from about −5° to about 15° C.

9. The system of claim 1, wherein the electrostatic source emits the electrostatic charge to at least one of a separate top sheet and a separate bottom sheet.

10. The system of claim 1, wherein the electrostatic charge activates functional additives incorporated into the film that improve film characteristics of binding, sealing, sanitizing, or atmosphere treatment effectiveness.

11. The system of claim 10, wherein the functional additives incorporated into the film are cling agents or sanitizing agents.

12. A system for enhancing adherence of a film before and/or during application of the film to a product, the system comprising: an electrostatic source for charging a film; and a stretch hooder for forming a bag from the film; wherein the electrostatic source emits an electrostatic charge to the film prior to or simultaneous to being formed, cut, or stretched.

13. The system of claim 12, wherein the electrostatic source is located on the stretch hooder.

14. The system of claim 12, wherein the electrostatic source emits a positive charge, a negative charge, or alternates between a positive charge and a negative charge.

15. The system of claim 12, wherein the electrostatic source emits an output from about 0.1 mA to about 0.9 mA.

16. The system of claim 12, wherein the electrostatic source emits a voltage from about 50 mV to about 200 mV.

17. The system of claim 12, wherein an operating distance of the electrostatic source is from about 5 mm to about 250 mm from the film.

18. The system of claim 12, wherein an ambient temperature is from about−5° to about 15° C.

19. The system of claim 12, wherein the electrostatic source emits the electrostatic charge to a separate bottom sheet.

20. The system of claim 12, wherein the electrostatic charge activates functional additives incorporated into the film that improve film characteristics of binding, sealing, sanitizing, or atmosphere treatment effectiveness.

21. The system of claim 20, wherein the functional additives incorporated into the film are cling agents or sanitizing agents.

* * * * *